United States Patent
Hanko et al.

(10) Patent No.: US 6,912,578 B1
(45) Date of Patent: Jun. 28, 2005

(54) METHOD AND APPARATUS FOR IMPROVING UTILIZATION OF A RESOURCE ON A SHARED CLIENT

(75) Inventors: James G. Hanko, Redwood City, CA (US); J. Duane Northcutt, Menlo Park, CA (US); Gerard A. Wall, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/513,652

(22) Filed: Feb. 25, 2000

(51) Int. Cl.⁷ .............................................. G06F 15/16
(52) U.S. Cl. ................... 709/227; 709/104; 709/210; 709/203; 709/226; 711/154; 713/200; 713/250
(58) Field of Search ............................... 709/227, 104, 709/210, 203, 250, 226; 711/154; 713/200

(56) References Cited

U.S. PATENT DOCUMENTS

| | | | |
|---|---|---|---|
| 5,414,750 A * | 5/1995 | Bhagat et al. ............... 455/416 |
| 5,550,970 A | 8/1996 | Cline et al. .................. 395/161 |
| 5,664,095 A | 9/1997 | Cox et al. ............. 395/184.01 |
| 5,678,024 A | 10/1997 | Wagar et al. ................ 395/456 |
| 5,778,385 A * | 7/1998 | Pratt ........................... 707/200 |
| 5,946,465 A * | 8/1999 | Chmielewski et al. ...... 709/226 |
| 6,014,748 A * | 1/2000 | Tushie et al. ............... 713/200 |
| 6,014,784 A * | 1/2000 | Taylor et al. .................... 5/713 |
| 6,061,726 A * | 5/2000 | Cook et al. .................. 709/226 |
| 6,157,927 A * | 12/2000 | Schaefer et al. ........ 707/103 R |
| 6,212,564 B1 * | 4/2001 | Harter et al. ................ 709/228 |
| 6,249,803 B1 * | 6/2001 | Jindal et al. ................. 709/203 |
| 6,272,129 B1 * | 8/2001 | Dynarski et al. ............ 370/356 |
| 6,298,422 B1 * | 10/2001 | Spilo et al. .................. 711/154 |
| 6,330,607 B1 * | 12/2001 | Chmielewski et al. ...... 709/227 |
| 6,347,339 B1 * | 2/2002 | Morris et al. ............... 709/237 |
| 6,393,569 B1 * | 5/2002 | Orenshteyn ................. 713/201 |
| 6,397,053 B1 * | 5/2002 | Ghiazza ....................... 455/343 |
| 6,402,028 B1 * | 6/2002 | Graham et al. ............. 235/380 |
| 6,411,986 B1 * | 6/2002 | Susai et al. .................. 709/203 |
| 6,412,015 B1 * | 6/2002 | Navare et al. ............... 709/250 |
| 6,434,532 B2 * | 8/2002 | Goldband et al. .............. 705/7 |
| 6,549,934 B1 * | 4/2003 | Peterson et al. ............ 709/203 |

FOREIGN PATENT DOCUMENTS

| | | |
|---|---|---|
| WO | WO 99/44129 | 9/1999 |
| WO | WO 99/55040 | 10/1999 |

OTHER PUBLICATIONS

"Design and Implementation of Distributed Multimedia Session Manager for Efficient Multi–point Applications" By Masahisa Kawahsima, Yoshinori Toyoda, and Junya Akiba, IEEE, Apr. 12, 1999, pp. 107–119.

* cited by examiner

*Primary Examiner*—William A. Cuchlinski, Jr.
*Assistant Examiner*—Thanh T. Nguyen
(74) *Attorney, Agent, or Firm*—Martine Penilla & Gencarella LLP (57) ABSTRACT

The present invention provides a method and apparatus for improving the utilization of a resource in a shared client computer environment. The invention overcomes the problem inherent in using traditional computer programs on a shared client, by monitoring the status of an application, determining when an application does not need a resource, and causing the application to stop consuming the resource. In one embodiment, resource consumption is not halted, but the application is caused to use less of the resource. The invention detects when a user has stopped interaction with an application. This can occur, for instance, when the user removes an identifier from the end user terminal. When the user interaction stops, the invention has a mechanism to stop a program from consuming resources (or to reduce its resource usage) and to restart it (or return it to its original state) later. The invention further includes a procedure for stopping or reducing the resource usage of the application when the user has stopped interacting with it, and to restart it when the user begins (or is capable of beginning) interaction with it. All this is done without modifying the application in any way.

20 Claims, 8 Drawing Sheets

METHOD AND APPARATUS FOR IMPROVING UTILIZATION OF A RESOURCE ON A SHARED CLIENT

BACKGROUND OF THE INVENTION

1. Field of the Invention

This invention relates to the field of networked computer systems.

2. Background Art

Computer users continue to desire high performance computing experiences in ever-changing computer environments. The computing paradigm is shifting. New architectures are emerging which require new solutions to deal with the need for a high performance computing experience. One such architecture is that of the thin-client computing system.

In the thin-client architecture, the functionality of the end user computer is reduced to the point that, for the most part, only input and output capabilities exist. The end user device is connected over a high bandwidth computer network to a more powerful server computer which performs all the functions traditionally associated with the personal computer, such as executing computer programs and processing data.

Thus, there is a trend to consolidate the processing for a vast number of users on a small number of powerful systems. The idea of "web-hosted" applications fits this model. The actual processing for all the users is concentrated on these shared client or consolidated client machines. They can be called consolidated client machines because, although they are often the equivalent of large server machines, they are performing the traditional role of the client in a client/server architecture, albeit for a large number of users. This type of architecture is economically beneficial because, typically, only a small portion of the user population needs to use these systems at any given time.

There are times when it is desirable to operate ordinary, pre-existing, computer programs on a consolidated or shared client system. Ordinary, pre-existing programs were typically designed for a single-user personal computers and workstations. On single-user personal computers and workstations, resources are plentiful because they are dedicated to the needs of one user operating one machine. As a result, many of the programs written for personal computers and workstations continue to consume resources (processing power and random access memory, for instance) even when the user stops interacting with them. Two examples of such applications are a screen saver or a web browser displaying animations.

In the shared client architecture, one could have 1000 users of the consolidated client, but only 100 end user terminals. Therefore, in this example, a maximum of 100 of the 1000 users (i.e. 10%) can be interacting with their applications simultaneously. If each of the unconnected users' programs continued to consume even a negligible amount of resources (for instance 0.2%), the consolidated client system would be overloaded and would not be able to perform any actions for the connected users because the 900 inactive users' programs, each of which consumes 0.2% of the system, would require 180% of the consolidated client's resources.

On a single-user system, a small load by a dormant application, such as a screen saver, would constitute a small, usually unnoticeable, extra load on the system. On consolidated client systems, however, this small load may be multiplied by tens, hundreds, or even thousands of users of the shared system. Thus, the small extra overhead these programs impose can consume all of the resources on the shared system, even when no useful work is being done.

The evolution that led to this problem is better understood by reviewing the development of network computing. The rise of the internet has resulted in the proposed use of so-called "network computers." A network computer is a stripped down version of a personal computer with less storage space, less memory, and often less computational power. The idea is that network computers will access data through the internet, and only those applications that are needed for a particular task will be provided to the network computer. When the applications are no longer being used, they are not stored on the network computer.

Recently, a new computer system architecture referred to as the virtual desktop architecture has emerged. This system provides for a re-partitioning of functionality between a central server installation and the user hardware. Data and computational functionality are provided by data sources via a centralized processing arrangement. At the user end, all functionality is substantially eliminated except that which generates output to the user (e.g. display and speakers), takes input from the user (e.g. mouse and keyboard) or other peripherals that the user may interact with (e.g. scanners, cameras, removable storage, etc.)

All computing is done by one or more consolidated client servers acting as central data sources and the computation is done independently of the destination of the data being generated. The output of a data source is provided to a terminal, referred to herein as a "Desktop Unit" (DTU). The DTU is capable of receiving the data and displaying the display data generated by the programs executing on the consolidated client servers.

The virtual desktop system architecture may be analogized to other highly partitioned systerns. For example, a public telephone company maintains powerful and sophisticated processing power and large databases at central offices. However, the DTU, (e.g., the telephone handset), is relatively simple and does not require upgrading when new features or services are added by the telephone company. The telephone itself becomes an appliance of low cost and extremely low obsolescence. Simnilarly, the display monitor of most computer systems has low obsolescence, and is typically retained through most desktop system upgrades.

The provision of services in the virtual desktop system architecture revolves around an abstraction referred to herein as a "session." A session is a representation of those services which are executing on behalf of a user at any point in time. The session abstraction is maintained by facilities known as the authentication and session managers, whose duty it is to maintain the database of mappings between tokens (i.e., unique identifiers bound to smart cards or other authentication mechanisms) and sessions, and to manage the services which make up each session. For each user that the system is aware of there can be one or more sessions. The session manager allows sessions to be configured and new sessions to be created.

Many sessions (e.g., a group of running applications) routinely execute on each consolidated client server. Since the central server computers may be executing multiple sessions for multiple users, and these running applications may comprise software designed to be run under a traditional architecture, for example, a personal computer where the user has a dedicated processor and memory, these sessions can potentially consume a tremendous amount of resources. These resources can be consumed even when the user is not interacting with the session, as they were not designed for consolidated client machines.

Historically, the control over the manner in which running applications consume resources was done manually. An operator would monitor system resources and start and stop applications or adjust their priorities as needed. In some systems, the application with the input focus (i.e., the application that will receive typed input) is given a boost in its priority. However, these strategies break down in the shared client computing architecture because of the vast number of DTUs or terminals that may connect to a shared client, and the diversity and unpredictability of the nature of the sessions. Clearly, it is necessary to find a way to improve the utilization of resources in a shared client computing environment.

SUMMARY OF THE INVENTION

The present invention provides a method and apparatus for improving utilization of one or more resources in a shared client computer environment. The invention overcomes the problem inherent in using traditional computer programs on a shared client, by monitoring the status of an application, determining when an application no longer needs resources, and causing the application to stop consuming resources. In one embodiment, resource consumption is not halted. Instead, the application is caused to use less of the resource.

An embodiment of the invention detects when a user has stopped interaction with an application. This can occur, for instance, when the user removes an identifier (e.g., smart card) from (that is, moves away from) the DTU. When the user interaction stops, the invention has a mechanism to stop a program from consuming resources (or to reduce its resource usage) and to restart it (or return it to its original state) later. The invention further includes a procedure for stopping or reducing the resource usage of the application when the user has stopped interacting with it, and to restart it when the user begins (or is capable of beginning) interaction with it.

In one embodiment, the invention implements a configurable filter or configuration file. This filter or file reduces or halts resource usage for a subset of the set of applications that may be running on any given shared client machine. All this is done without modifying the application in any way.

DETAILED DESCRIPTION OF THE INVENTION

The present invention provides a method and apparatus for improving resource utilization in a shared client computer environment. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

One or more embodiments of the invention may implement the load distribution mechanisms described in U.S. patent application Ser. No. 09/513,655, filed on Feb. 25, 2000, entitled "Method and Apparatus for Distributing Load in a Computer Environment", and assigned to the present assignee, the specification of which is herein incorporated by reference.

One or more embodiments of the invention may also implement the mechanisms for making a computational service highly available described in U.S. patent application Ser. No. 09/513,015, filed on Feb. 25, 2000, entitled "Method and Apparatus for Making a Computational Service Highly Available", and assigned to the present assignee, the specification of which is incorporated herein by reference.

In modern systems, there is a trend to consolidate the processing for a vast number of users on a small number of powerful systems. The idea of "web-hosted" applications fits this model. The actual processing for all the users is concentrated on these shared client or consolidated client machines. Shared client machines can be called consolidated client machines because, although they are often the equivalent of large server machines, they are performing the traditional role of the client in a client/server architecture, albeit for a large number of users. This type of architecture is economically beneficial because, typically, only a small portion of the user population needs to use these systems at any given time.

There are times when it is desirable to operate ordinary, pre-existing, computer programs on a consolidated or shared client system. Existing programs were typically designed for a single-user personal computers and workstations. On single-user personal computers and workstations, resources are plentiful because they are dedicated to the needs of one user operating one machine. As a result, many of the programs written for existing machines continue to consume resources (processing power and random access memory, for instance) even when the user stops interacting with them.

On a single-user system, this would constitute a small, usually unnoticeable, extra load on the system. However, on a consolidated client system, this small load may be multiplied by tens, hundreds, thousands, or even millions of users of the shared system. Thus, the small extra overhead these programs impose can consume all of the resources of the shared system, even when no real work is being done.

The present invention overcomes the problem inherent in using traditional computer programs on a shared client, by monitoring the status of an application, determining when an application does not need a resource or set of resources, and causing the application to stop consuming the resource or resources. In one embodiment, resource consumption is not hated, but the application is caused to use less of the resource.

The invention detects when a user has stopped interaction with an application. This can occur, for instance, when the user removes a smart card from a DTU. When the user interaction stops, the invention has a mechanism to stop a program from consuming resources (or to reduce its resource usage) and to restart it (or return it to its original state) later. The invention further includes a procedure for stopping or reducing the resource usage of the application when the user has stopped interacting with it, and to restart it when the user begins (or is capable of beginning) interaction with it. All this is done without modifying the application in any way.

Virtual Desktop System Architecture

In one embodiment, the present invention is implemented in the computer system architecture referred to as the virtual desktop system architecture. This material is described in co-pending U. S. patent application Ser. No. 09/063,335, filed Apr. 20, 1998, entitled "Method and Apparatus for Providing a Virtual Desktop System Architecture" and assigned to the present assignee, and incorporated herein by reference.

The virtual desktop system architecture provides for a re-partitioning of functionality between a central server installation and the user hardware. Data and computational functionality are provided by the servers via a centralized processing arrangement. At the user end, all functionality is eliminated except that which generates output to the user (e.g. display and speakers), takes input from the user (e.g. mouse and keyboard) or other peripherals that the user may interact with (e.g. scanners, cameras, removable storage, etc.).

All computing is done by the central servers and the computation is done independently of the destination of the data being generated. The output of the server is provided to a DTU. The DTU is capable of receiving the data and displaying the data. The functionality of the system is partitioned between a display and input device and servers. The display and input device is the DTU. The partitioning of this system is such that state and computation functions have been removed from the DTU and reside on servers. In one embodiment of the invention, one or more servers communicate with one or more DTUs through some interconnect fabric, such as a network.

Figure 1:
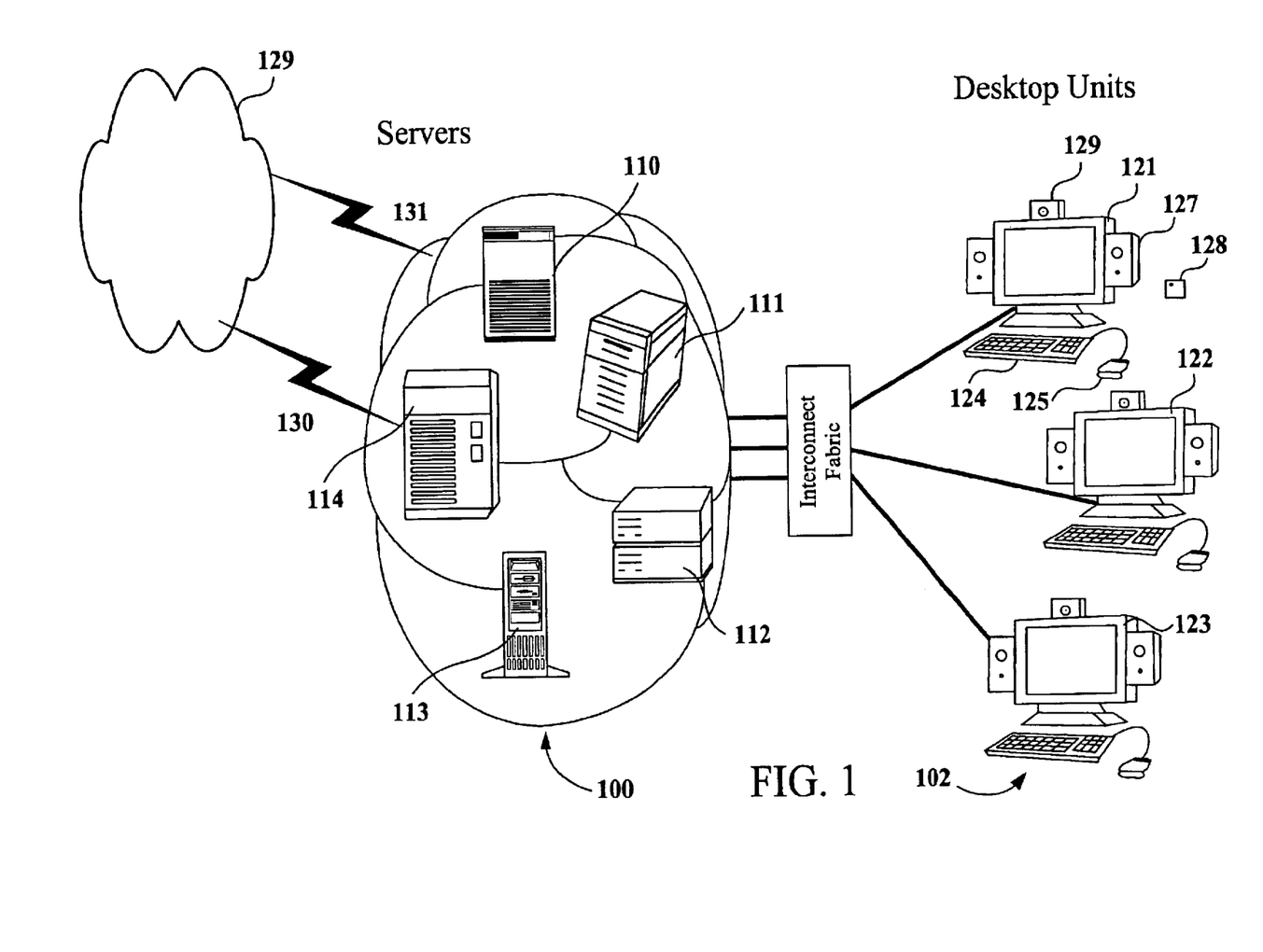
FIG. 1 illustrates the virtual desktop system architecture of the present invention.

An example of such a system is illustrated in FIG. 1. Referring to FIG. 1, the system consists of servers 100 communicating data through interconnect fabric 101 to DTUs 102. It should be noted, however, that resource utilization strategies are not limited to the virtual desktop system architecture. Embodiments of the present invention are implemented in conjunction with a general purpose computer, like that described in FIG. 2.

Embodiment of General-purpose Computer Environment

Figure 2:
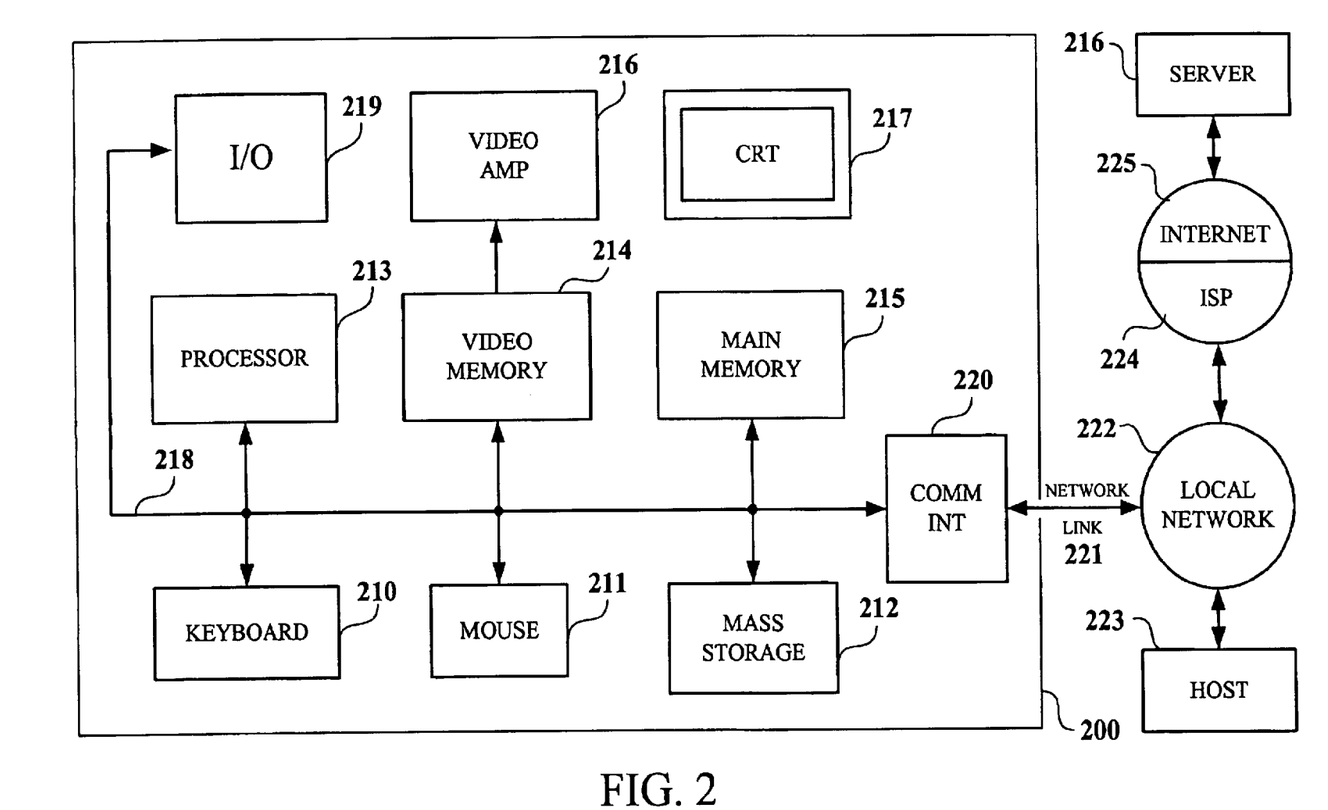
FIG. 2 is a block diagram of an example computer system that can be used with the present invention.

One embodiment of the invention can be implemented as computer software in the form of computer readable program code executed on a general purpose computer such as computer 200 illustrated in FIG. 2. A keyboard 210 and mouse 211 are coupled to a bi-directional system bus 218. The keyboard and mouse are for introducing user input to the computer system and communicating that user input to central processing unit (CPU) 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and CPU 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as CPU 213, main memory 215, video memory 214 and mass storage 212. Alternatively, multiplex data/address lines may be used instead of separate data and address lines.

In one embodiment of the invention, the CPU 213 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220. In accord with the invention, one such downloaded application is the using and accessing of information from fonts in multiple formats described herein.

The received code may be executed by CPU 213 as it is received, and/or stored in mass storage 212, or other non-volatile storage for later execution. In this manner, computer 200 may obtain application code in the form of a carrier wave.

The computer systems described above are for purposes of example only. An embodiment of the invention may be implemented in any type of computer system or programming or processing environment.

Computational Service Providers

With reference to the virtual desktop system architecture, computational power and state maintenance is found in the service providers, or services. The services are not tied to a specific computer, but may be distributed over one or more traditional desktop systems such as described in connection with FIG. 2, or with traditional servers. One computer may have one or more services, or a service may be implemented by one or more computers. The service provides computation, state, and data to the DTUs and the service is under the control of a common authority or manager. In FIG. 1, the services are found on computers 110, 111, 112, 113, and 114. It is important to note that the central data source can also be providing data that comes from outside of the central data source 129, such as for example, the internet or world wide web 130. The data source could also be broadcast entities such as those that broadcast data such as television or radio signals 131. A service herein is a process that provides output data and responds to user requests and input.

It is the responsibility of the service to handle communications with the DTU that is currently being used to access the given service. This involves taking the output from the computational service and converting it to a standard protocol for the DTU. This data protocol conversion is handled in one embodiment of the invention by a middleware layer, such as the X11 server, the Microsoft Windows interface, a video format transcoder, the OpenGL interface, or a variant of the java.awt.graphics class within the service producer machine, although other embodiments are within the scope of the invention. The service machine handles the translation to and from the virtual desktop architecture wire protocol.

The service producing computer systems connect directly to the DTUs through the interconnect fabric. It is also possible for the service producer to be a proxy for another device providing the computational service, such as a database computer in a three tiered architecture, where the proxy computer might only generate queries and execute user interface code.

Interconnect Fabric

The interconnect fabric is any of multiple suitable communication paths for carrying data between the services and the DTUs. In one embodiment, the interconnect fabric is a local area network implemented as an Ethernet network. Any other local network may also be utilized. The invention also contemplates the use of wide area networks, the internet, the world wide web, an intranet, a local area network, and others. The interconnect fabric may be implemented with a physical medium such as a wire or fiber optic cable, or it may be implemented in a wireless environment.

Desktop Units

The DTU is the means by which users access the services. FIG. 1 illustrates DTUs 121, 122, and 123. A DTU may consist of a display 126, a keyboard 124, mouse 125, and audio speakers 127. The DTU includes the electronics needed to interface these devices to the interconnect fabric and to transmit to and receive data from the services.

Figure 3:
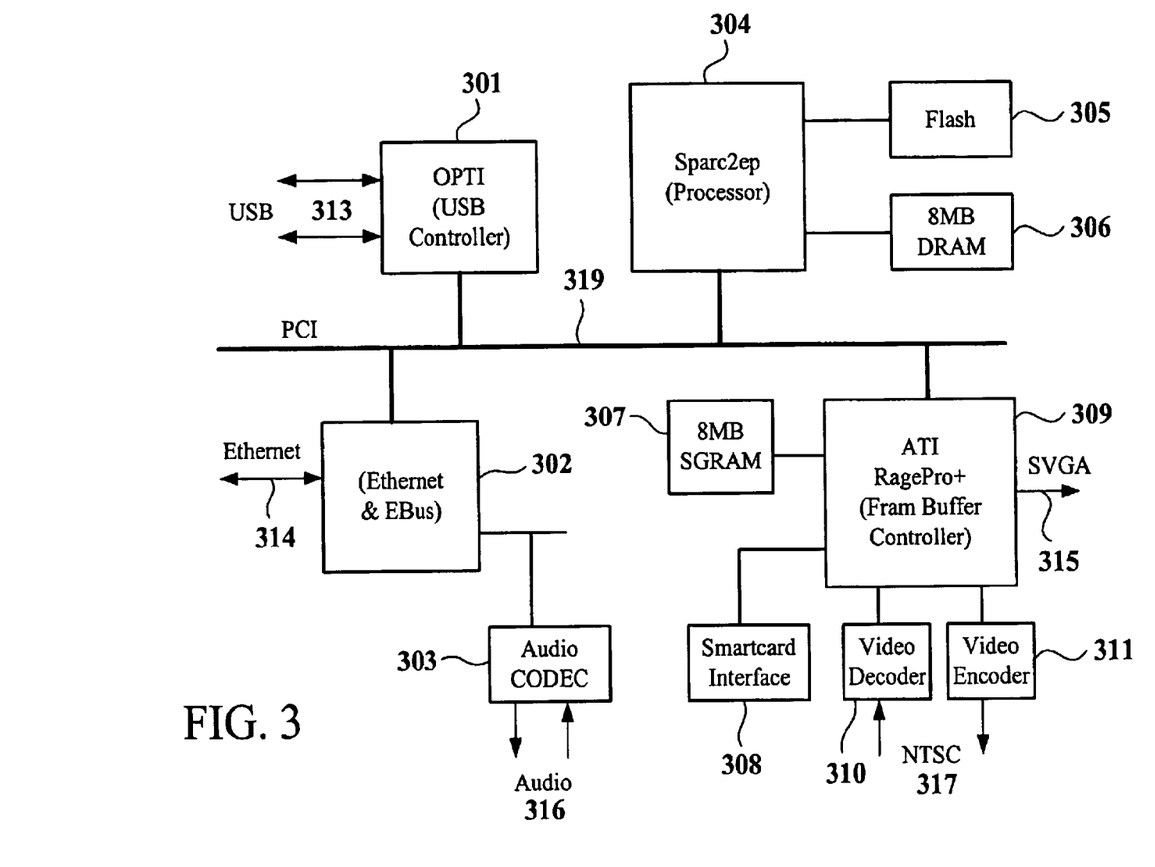
FIG. 3 is a block diagram of one embodiment of an DTU of the present invention.

A block diagram of a DTU is illustrated in FIG. 3. The components of the DTU are coupled internally to a PCI bus 319. A network controller 302 communicates to the interconnect fabric, such as an ethernet, through line 314. An audio codec 303 receives audio data on interface 316 and is coupled to network controller 302. USB data communication is provided on lines 313 to USB controller 301.

An embedded processor 304 may be, for example, a Sparc2ep with coupled flash memory 305 and DRAM 306. The USB controller 301, network controller 302 and embedded processor 304 are all coupled to the PCI bus 319. Also coupled to the PCI bus 319 is the video controller 309 with associated SGRAM 307. The video controller 309 may be for example, an ATI RagePro+ frame buffer controller that provides SVGA output on line 315. Data is optionally provided in and out of the video controller through video decoder 310 and video encoder 311 respectively. This data may comprise digital or analog video signals (e.g., NTSC (National Television Systems Committee), PAL (Phase Alternate Line), etc.). A smart card interface 308 may also be coupled to the video controller 309.

Figure 4:
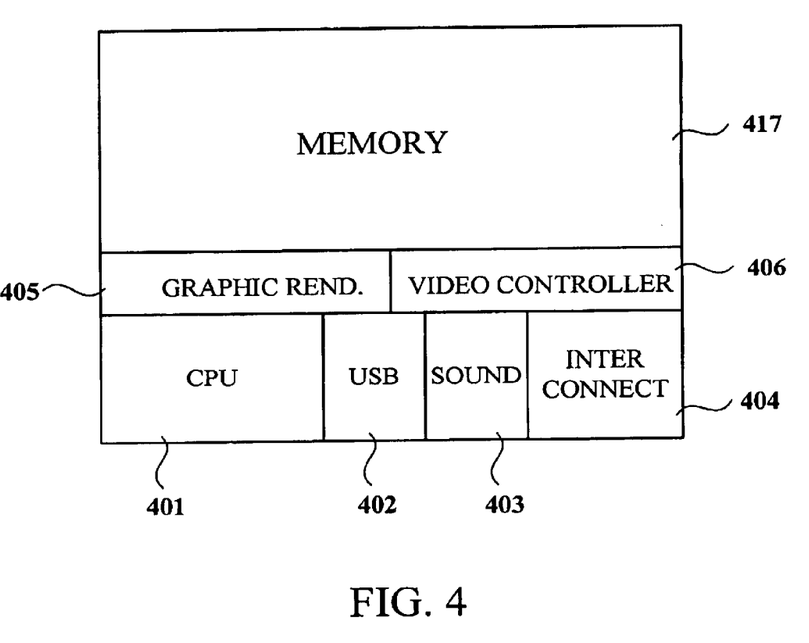
FIG. 4 illustrates a single chip DTU embodiment of the present invention.

Alternatively, the DTU can be implemented using a single chip solution as illustrated in FIG. 4. The single chip solution includes the necessary processing capability implemented via CPU 401 and graphics renderer 405. Chip memory 407 is provided, along with video controller/interface 406. A universal serial bus (USB) controller 402 is provided to permit communication to a mouse, keyboard and other local devices attached to the DTU. A sound controller 403 and interconnect interface 404 are also provided. The video interface shares memory 407 with the CPU 401 and graphics renderer 405. The software used in this embodiment may reside locally in non volatile memory or it can be loaded through the interconnect interface when the device is powered.

Operation of the Virtual Desktop System Architecture Session Handling The provision of services in the virtual desktop system architecture revolves around an abstraction referred to herein as a session. A session is a representation of those services which are executing on behalf of a user at any point in time. A new session is created when a new token is presented through the DTU to the authentication manager. A token is a unique identifier, which may be an ethernet address of a DTU (pseudo-token) or the serial number on a smart card.

The session abstraction is maintained by facilities known as the authentication and session managers, whose duty it is to maintain the database of mappings between tokens and sessions, and to manage the services which make up each session. For each token that the system is aware of the fact that there are one or more sessions. The session manager offers a service to the user or administrator that allows sessions to be configured and new sessions to be created.

A session is not tied to any particular DTU. A token is associated with the user session, and the session can be displayed on any DTU where the user inserts his or her smart card. An software process known as the authentication manager is responsible for ensuring the legitimacy of a token and associating a token with its desired session. The DTU is typically in sleep, stand-by, or off mode when not in use. When a user wants to use a particular DTU, the user's access is validated in an authentication exchange that may comprise one or more of a smart card, key, password, biometric mechanism, or any other suitable authentication mechanism. The token extracted from this exchange is then used to establish a connection to the appropriate session When the authentication manager validates a token, it notifies the server's session manager, which in turn notifies all of the services within the selected session, and the session's display is composed at the server and transmitted to the user's desktop. From within a session, a user can interact with existing services, initiate new services, or kill off executing services. When the user departs from the DTU (e.g., by withdrawing a smart card) the authentication manager notes this and notifies the session manager, which in turn notifies all of its related services, which stop their display functions, and the DTU returns to its dormant state. The effect of the activation and deactivation of an DTU is similar to turning off the display monitor on a desktop system. The services of the user's session are still available and perhaps executing, but no display is generated. One advantage of the present invention is that the services available in a session can be accessed on any connected DTU.

Figure 5:
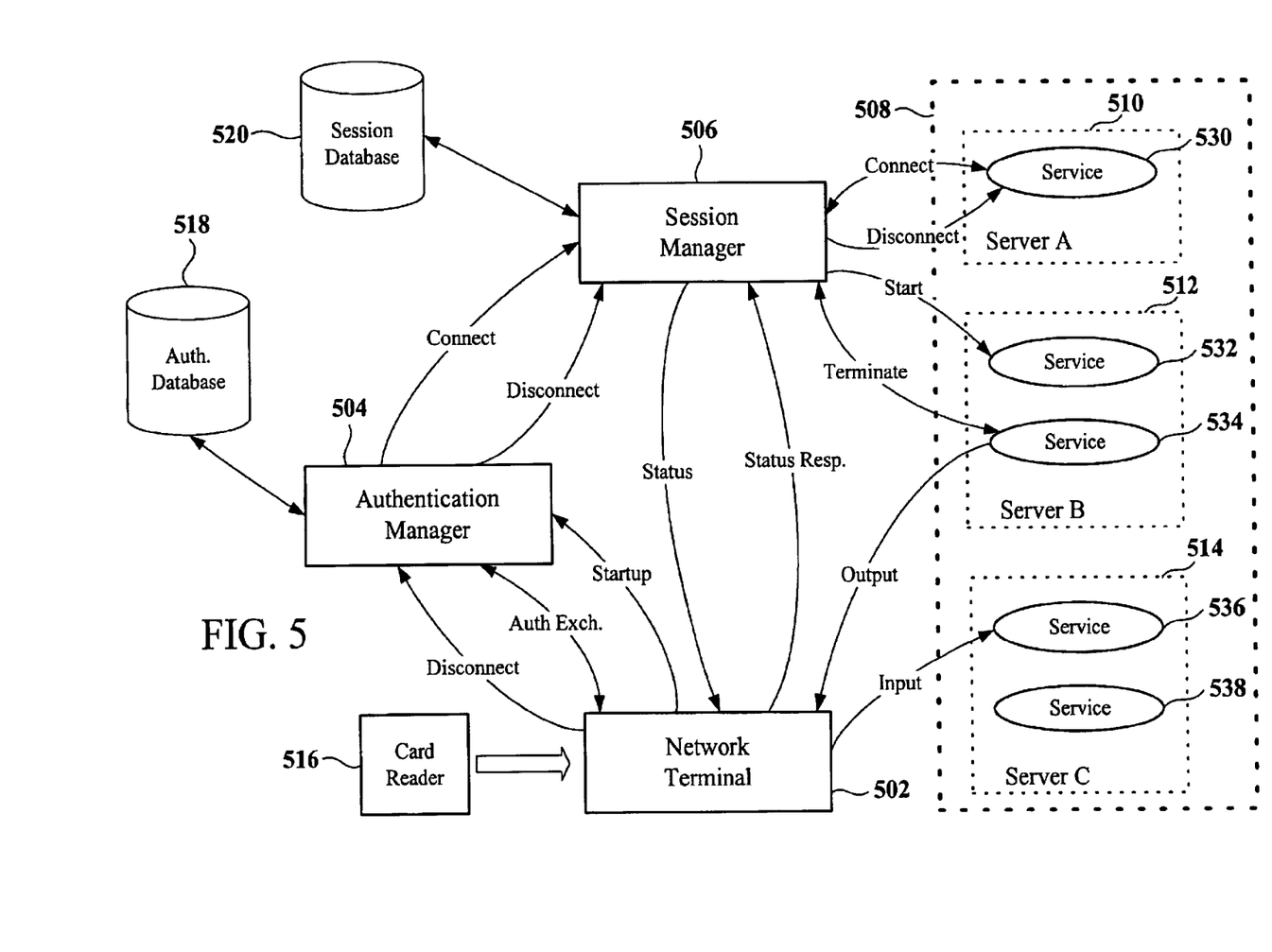
FIG. 5 illustrates an example of session management and authorization in the present invention.

FIG. 5 provides an example of session management and authorization in the present invention. This material is described in co-pending U.S. patent application Ser. No. 09/063,339, filed Apr. 20, 1998, entitled "Method and Apparatus for Session Management and User Authentication" and assigned to the present assignee, and incorporated herein by reference. Network terminal 502 is a DTU, having the task of displaying output of services to a user and obtaining input to services from the user. Network terminal 502 has the ability to respond to a command (e.g., display command) received from, for example, a software program (e.g., services 530–538, authentication manager 504 and session manager 506) executing on a computational service provider. The input received from a user is forwarded to, for example, a service that is fulfilling a user request.

A service is a program that performs some function for a user. More than one server can execute the services that comprise a session. For example, in session 508, service 530 is executing on server 510, services 532 and 534 are executing on server 512 and services 536 and 538 are executing on server 514.

A user accesses a system (e.g., a server, a session, a service and a network terminal) by initiating a login. During login, the user is validated by authentication manager 504. Various techniques can be used to allow the user to initiate a login. For example, the user can initiate a login by pressing a key on network terminal 502.

In one embodiment, a user accesses the system by inserting a smart card in a card reader (e.g., card reader 516) attached to network terminal 502. A smart card is a card that is capable of storing information such as in a magnetic strip or memory of the smart card. The smart card can store user information such as a user's identification (i.e., user ID such as a 64-bit number) and, optionally, a secret code (e.g., a 128-bit random number) that is transmitted to network terminal 502. The secret code may be used during authentication.

Network terminal 502 is aware of (or can obtain) its interconnection network address and the address of authentication manager 504. When a user initiates the login, network terminal 502 initiates communication with authentication manager 504 to begin authentication. Authentication manager 504 is a program active (e.g., executing) on a server connected to network terminal 502 via an interconnection network such as a local area network (LAN), for example. It should be apparent, however, that network terminal 502 can be connected to authentication manager 504 using other interconnection network technologies such as a fiber channel loop, point-to-point cables, or wireless technologies. Network terminal 502 sends a startup request to authentication manager 504 that includes a user identification (userID).

If the expected result is received from the user, authentication manager 504 notifies session manager 506 (via a connect message) that the user has logged into the system on network terminal 502. Session information contained in authentication database 518 is used to identify the server, port and session identifier (ID) for session manager 506. Session manager 506 is a program that is active on a computational service provider and is connected to authentication manager 504 and network terminal 502 via an interconnection network, for example. Authentication manager 504 sends a message to session manager 506 using session manager 506's server and port information contained in authentication database 518.

In response to the connect message from authentication manager 504, session manager 506 notifies the services in the user's current session (i.e., the services in session 508) that the user is attached to network terminal 502. That is, session manager 506 sends a connect message to services 530–538 to direct output to network terminal 502. Session manager 506 ensures that services that are considered to be required services of the session are executing. If not, session manager 506 causes them to be initiated. The user can interact with services 530–538 within a session (e.g., session 508). Network terminal 502 is connected to servers 510, 512 and 514 (and services 530–538) via an interconnection network such as a local area network or other interconnection technology. The user can also start new services or terminate existing services.

The user can quit using the system by removing the card from card reader 516. Other mechanisms to quit the system can also be used with the invention (e.g., a "sign-off" button on network terminal 502). Services 530–538 can continue to run even after the user removes the card from card reader 516. That is, a user's associated session(s) and the services that comprise a session can continue in existence during the period that a user is logged off the system. When the user removes the card from card reader 516, network terminal 502 notifies authentication manager 504 (e.g., via a disconnect message) which notifies session manager 506 (e.g., via a disconnect message). Session manager 506 notifies services 530538 (e.g., via a disconnect message) which terminate their transmission of display commands to network terminal 502. Services 530–538 continue execution, however, during the time that the user is away from a network terminal. The user can log back in using a network terminal such as network terminal 502, to connect to session 508 and interact with services 530–538.

Hot Desking

Figure 6:
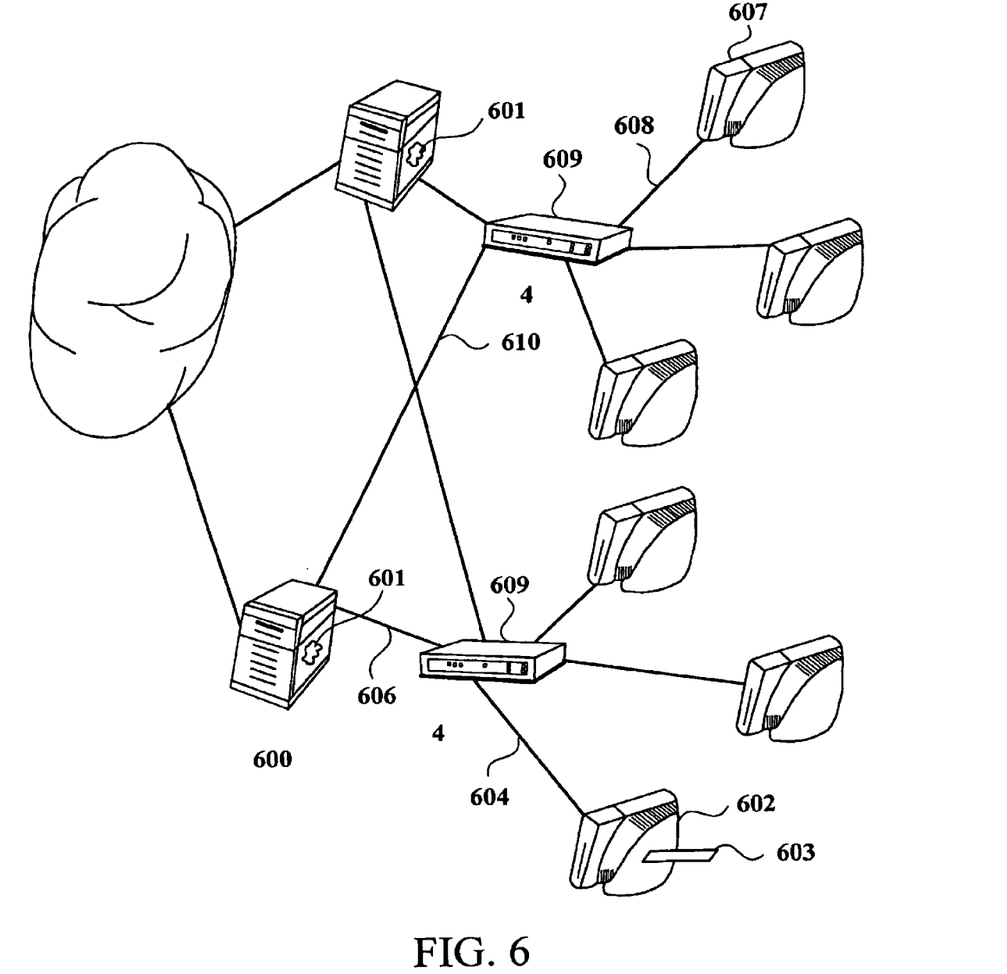
FIG. 6 illustrates user interaction in accordance with the present invention.

An embodiment of the present invention may employ a mechanism referred to herein as "hot desking." Hot desking facilitates the determination that a given user is at a given DTU and that a session is active or inactive. Identifying a user by the token unique to an identifier the user has inserted into a specific DTU allows for a communication of that user's input and graphical output between that DTU and a server. Knowledge of when a user removes a token allows for a determination of when a session has become inactive. An example of hot desking is illustrated by FIG. 6.

In order for DTU 602 to communicate with server 600, a user must insert an identifier 603 (e.g., a smart card) into DTU 602 and attempt to authenticate to server 600 via interconnect fabric 604 to switch 605, across interconnect fabric 606 and finally to server 600. If the user later removes the identifier 603 and inserts it at another DTU, for instance DTU 607, the same session is resumed at the new DTU 607, by the network path defined from DTU 607 to server 600 via interconnect fabric 608, to switch 609, and across interconnect fabric 610. Output proceeds to DTU 607 at the second location. In one embodiment, the identifier is a smart card, but this identifier may also comprise a key, password, biometric identifier, or any other mechanism which identifies a user attempting to initiate a session or resume a session that was there-before inactive.

Because of the virtual desktop system design, it is possible to have a large number of users with a session (a group of one or more running applications) on the consolidated client machine, who are not actively connected to it. For example, one could have 1000 users with a session, but only 100 end user terminals. Therefore, in this example, a maximum of 100 of the 1000 users (10%) can be interacting with their applications simultaneously. If each of the unconnected sessions continued to consume even a negligible amount of resources (for instance 0.2%), the consolidated client system would be overloaded and would not be able to perform any actions for the connected users because the 900 inactive sessions consuming only 0.2% would require 180% of the consolidated client's resources.

The invention determines if the user is actively connected to a DTU. When the user removes the identifier, (e.g., a smart card, biometric identifier, or other identifier), and the session is not connected to any DTU, the invention knows that the user has stopped interacting with the applications in his or her session.

Algorithms for Improving Resource Utilization

One embodiment is practiced under the Solaris™ and Unix operating systems. It should be noted, however, that this invention may be practiced under any computer operating system. In the embodiments running under Solaris or Unix, features of those operating systems facilitate the stopping and restarting of certain active processes, for instance, processes where the user has removed an identifier.

In another embodiment, when the identified application attempts to consume resources, such as random access memory or processing power, these attempted activities are written to a permanent storage medium, for instance a hard disk drive. When it becomes necessary to allow the application to begin consuming resources again, for instance when a user re-inserts the identifier, the data written to the permanent storage medium is recovered and the process restarts at the point where it was halted.

Figure 7:
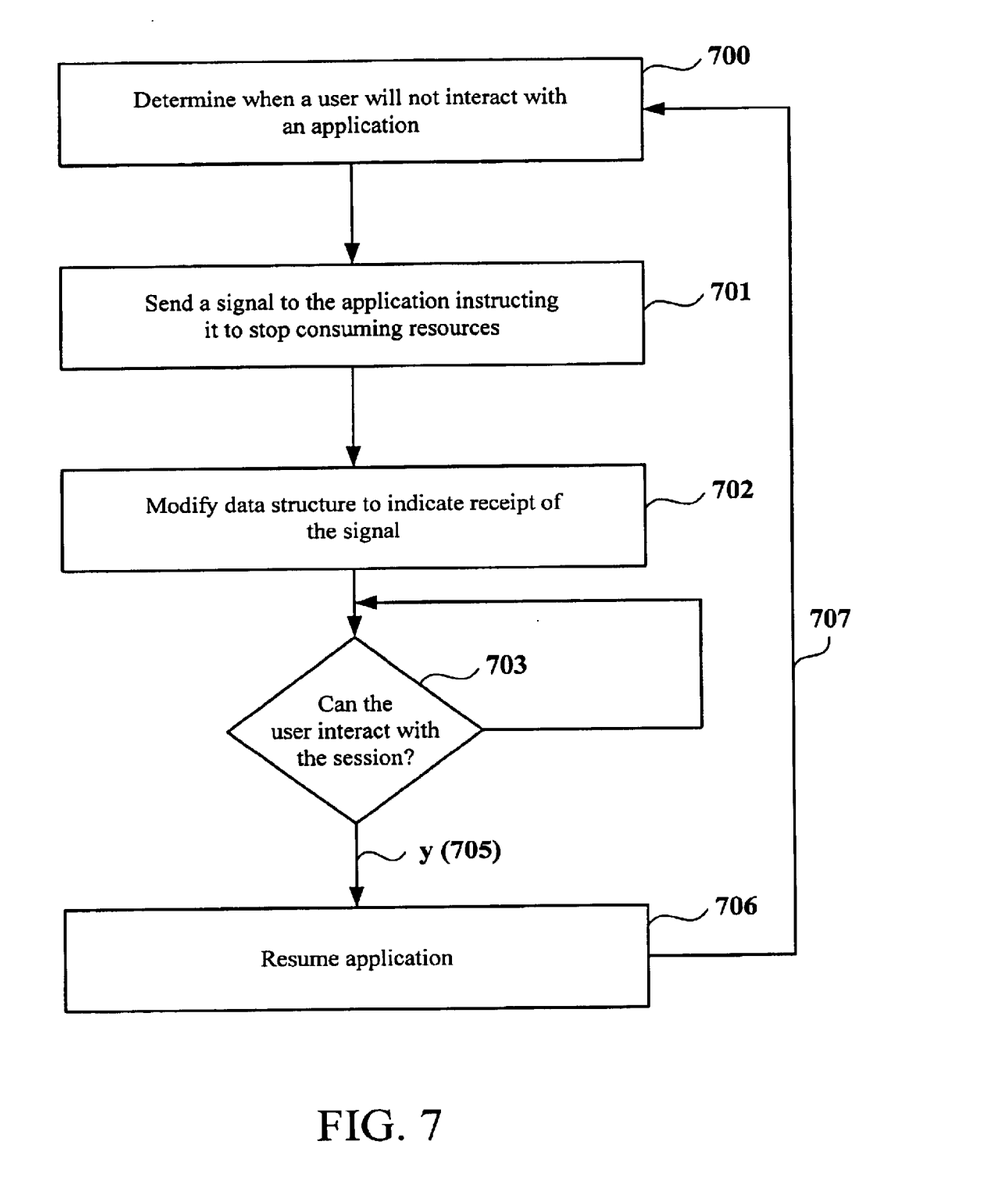
FIG. 7 is a flow control diagram of the resource utilization algorithm in accordance with the present invention.

One embodiment of the present invention is illustrated by FIG. 7. The invention determines when a user will not interact with an application 700. When it does it transmits a STOP signal 701 to one or more applications within the session to halt the consumption of resources while there is no chance of user input and no need for user output.

In this embodiment, each application has with it an associated data structure. When the STOP signal is sent to the application, this event is noted in the data structure 702. For instance, one embodiment implements this in a Boolean fashion (e.g., by setting a stop value to true). While the value within the data structure is true, the application is prevented from running, and hence, consuming resources.

The invention then periodically queries whether (or receives notification that) the user's session has resumed activity 703, and hence, raises the possibility of user interaction with the application. If the session has not become active, flow proceeds along transition 704. If the session has become active, flow proceeds along transition 705, and the application resumes 706. The process then repeats, as indicated by transition 707.

In one embodiment, when the user later connects to the same or a different DTU, a CONTINUE signal (or message) is sent to each application process that was sent a STOP signal (or message) when the session was disconnected. In one embodiment, this can reset the Boolean value in the application data structure, (to false, for instance). Thereafter, these application programs begin running again where they left off.

As stated previously, where supported, embodiments of the invention may use commands of the operating system to facilitate stopping and continuing processes. For example, under the Solaris operating system, the "pstop" and "pstart"

commands will force an application process to stop execution and resume execution, respectively. Therefore, rather than (or in addition to) sending signals (or messages) and modifying the data structure as described in FIG. 7, stop and continue commands may be issued directly to the operating system.

In one embodiment, a subset of the applications within the user's session are sent the STOP and CONTINUE signal. Which subset of the applications that receive the signals is configurable by the system administrator or the user. Although it is possible to send these signals to all applications in the user's session, it may often be desirable to limit this to a subset of them. Some applications may stop their resource consumption automatically, so there is no need to stop them. Other applications may not react properly to the STOP and CONTINUE signals, so the algorithm should not be applied to such applications. One embodiment of the invention uses a configurable filter wherein the user or system administrator selects a set of problem applications that should be stopped when the user's session is disconnected. Another embodiment, utilizes a configuration file to determine how the algorithm is applied and to which subset of the applications it should be applied.

Figure 8:
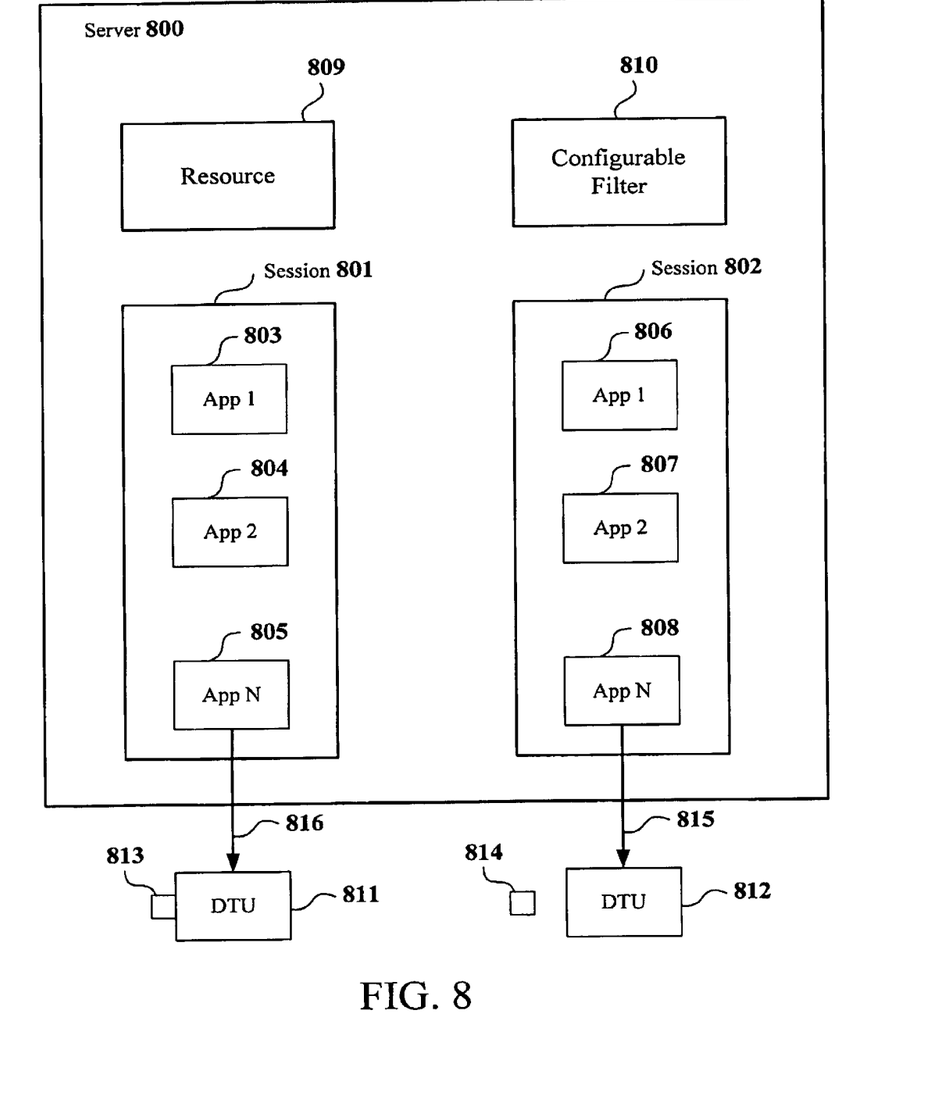
FIG. 8 illustrates the operation of the configurable filter or configuration file in accordance with the present invention.

The operation of the configurable filter or configuration file is illustrated by FIG. 8. Within server 800, there reside session 801 and session 802. Within session 801 are applications 1 through n, designated 803, 804, and 805. Within session 802 are applications 1 through n, designated 806, 807, and 808. Within the server is also resource 809, which could be any resource within a computing machine subject to contention from the applications. This includes processor power and memory. In addition, a configurable filter or configuration file is designated as 810. DTUs are indicated as 811 and 812 with identifiers 813 and 814, connected to the server by interconnect fabrics 815 and 816.

Session 801 is an active session as indicated by the association between identifier 813 and DTU 811. Session 802 is an inactive session as indicated by the disassociation between identifier 814 and DTU 812. Even though session 802 is inactive, processes 806, 807, and 808 may still consume resource 809. Configurable filter has a list of problem applications. In this example, applications 806 and 807 are problem applications because despite the inactivity of the session, they still consume resource 809. Configurable filter (or configuration file) 810, therefore, will stop applications 806 and 807 from consuming resource 809, while token 814 is disassociated with DTU 812. If identifier 814 becomes associated with DTU 812, or another DTU, 811, for instance, the filter will allow consumption of resource 809 by applications 806 and 807 to resume.

Those applications that do not respond well to the signals may have their resource usage reduced in similar runner. For example, one embodiment reduces their processor scheduling priority while the session containing the application is not in communication with a DTU. The priority is restored when a connection is reestablished. In one embodiment resource usage, such as random access memory or processor power, is reduced for certain sessions, but filter 810 does not completely halt the process. Thus, in FIG. 8, the identified problem applications 806 and 807 do not have to be stopped by filter 810, but their resource consumption has been reduced.

Thus, a method and apparatus for improving resource utilization in a shared client computer environment has been provided in conjunction with one or more specific embodiments. The invention is defined by the claims and their full scope of equivalents.

We claim:

1. A method of improving access to one or more resources on a client server comprising:

serving a plurality of applications from said client server to a stateless Desktop Unit (DTU);

determining when an application served from said client server to said stateless DTU should become inactive;

filtering said application from said plurality of applications served from said client server via a filter located within said client server and separated from said plurality of applications;

sending a first signal to said application served from said client server to indicate that said application should stop or reduce consuming said one or more resources on said client server via said filter;

determining when said application served from said client server should resume activity; and sending a second signal to said application served from said client server to indicate that said application should resume or increase consuming said one or more resources on said client server via said filter.

2. The method of claim 1, wherein said determining when said application should become inactive comprises determining when a session associated with a user is no longer active by identifying when said stateless DTU is disassociated with said session.

3. The method of claim 2, wherein said client server maintains said session with said user when said user is disconnected with said stateless DTU.

4. The method of claim 2, wherein said client server is shared by a plurality of stateless DTUs and wherein said determining when said application should resume activity comprises determining when said session becomes active by identifying when any stateless DTU of said plurality of stateless DTUs becomes re-associated with said session.

5. The method of claim 2, wherein an identifier is used to cause the association and wherein said identifier comprises a smart card.

6. The method of claim 2, wherein said filtered application is an application that continues to consume said one or more resources on said client server when said session associated with said user of said filtered application is no longer active.

7. The method of claim 1, wherein said application is a member of said plurality of applications.

8. The method of claim 7, wherein said member comprises a subset of said plurality of applications.

9. The method of claim 1, wherein:

said first signal comprises an operating system command to stop a process; and said second signal comprises an operating system command to start a process.

10. The method of claim 1, wherein each of said serving, filtering, sending, and determining steps are performed without modifying said application in any way via said filter separated from said plurality of applications.

11. The method of claim 1, wherein said client server provides a computational power for said stateless DTU and a state maintenance for said stateless DTU.

12. A client server serving a plurality of applications to a stateless Desktop Unit (DTU), the client server comprising:

a resource;

a filter for managing consumption of said resource;

wherein said filter is separated from said plurality of applications;

a first session associated with a user on a first stateless DTU;

wherein said first session is disassociated with said first DTU, indicating that said first session is inactive;

a first signal transmitted from said filter to at least one member of said plurality of applications indicating that said at least one member should stop consuming said resource;

wherein said first session associated with said user becomes re-associated with any stateless DTU, indicating that said session has resumed activity; and a second signal transmitted from said filter to said at least one member indicating that said at least one member should resume consuming said resource.

13. The server of claim 12, wherein said any stateless DTU comprises said first stateless DTU and a second stateless DTU.

14. The server of claim 12, wherein an identifier is used to cause the association and wherein said identifier comprises a smart card.

15. The server of claim 12, wherein said client server comprises a first client server and a second client server, wherein said first and second signals are sent by said first client server comprising said filter, and wherein said plurality of applications are served by said second client server.

16. The server of claim 12, wherein said at least one member comprises a subset of said plurality of applications.

17. A computer program product comprising:

a plurality of client servers having computer readable program code embodied therein for improving access to one or more resources on said plurality of servers comprising:

computer readable program code configured to cause a stateless Desktop Unit (DTU) to improve access to one or more resources on at least one of said plurality of client servers serving a plurality of applications to said DTU comprising:

computer readable program code configured to cause at least one of said plurality of client servers to determine when an application should become inactive;

computer readable program code configured to cause a filter on at least one of said plurality of client servers to filter said application from said plurality of application;

computer readable program code configured to cause at least one of said plurality of client servers via said filter to send a first signal to said application indicating that said application should stop or reduce consuming said one or more resources;

computer readable program code configured to cause at least one of said plurality of client servers to determine when said application should resume activity; and computer readable program code configured to cause at least one of said plurality of client servers via said filter to send a second signal to said application indicating that said application should resume or increase consuming said one or more resources.

18. The computer program product of claim 17, wherein said computer readable program code configured to cause said client server to determine when said application should become inactive comprises computer readable program code configured to cause at least one of said plurality of client servers to determine when a session is no longer active by identifying when said stateless DTU is disassociated with said session.

19. The computer program product of claim 17, wherein said computer readable program code configured to cause said server to determine when said application should resume activity comprises computer readable program code configured to cause at least one of said plurality of client servers to determine when said session becomes active by identifying when any DTU becomes re-associated with said session.

20. The computer program product of claim 17, wherein said first signal and said second signal comprise operation system commands.

* * * * *